United States Patent
Vaquero Gomez et al.

(10) Patent No.: US 11,315,269 B2
(45) Date of Patent: Apr. 26, 2022

(54) SYSTEM AND METHOD FOR GENERATING A POINT CLOUD THAT INCLUDES SURFACE NORMAL INFORMATION

(71) Applicant: Toyota Research Institute, Inc., Los Altos, CA (US)

(72) Inventors: Victor Vaquero Gomez, Colmenar Viejo (ES); Rares A. Ambrus, San Francisco, CA (US); Vitor Guizilini, Santa Clara, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 17/001,067

(22) Filed: Aug. 24, 2020

(65) Prior Publication Data
US 2022/0058817 A1  Feb. 24, 2022

(51) Int. Cl.
 *G06K 9/00* (2006.01)
 *G06T 7/521* (2017.01)
 *G06T 7/593* (2017.01)

(52) U.S. Cl.
 CPC ............ *G06T 7/521* (2017.01); *G06T 7/593* (2017.01); *G06T 2207/10028* (2013.01); *G06T 2207/20084* (2013.01); *G06T 2207/30252* (2013.01)

(58) Field of Classification Search
 CPC ............ G06T 7/521; G06T 7/593; G06T 2207/10028; G06T 2207/20084; G06T 2207/30252
 See application file for complete search history.

(56) References Cited

U.S. PATENT DOCUMENTS

| | | | |
|---|---|---|---|
| 8,379,969 B2* | 2/2013 | Barrois | G01B 11/245 382/154 |
| 9,363,501 B2* | 6/2016 | Blassnig | G06T 7/0012 |
| 10,192,345 B2* | 1/2019 | Lindner | G06T 1/20 |

(Continued)

OTHER PUBLICATIONS

Wang et al., "Pseudo-LiDAR from Visual Depth Estimation: Bridging the Gap in 3D Object Detection for Autonomous Driving," 2019 IEEE/CVF Conference on Computer Vision and Pattern Recognition (CVPR), pp. 8445-8453.
Man et al., "GroundNet: Monocular Ground Plane Estimation with Geometric Consistency," 10 pages, arXiv:1811.07222v3 [cs CV] May 11, 2019.
Weng et al., "Monocular 3D Object Detection with Pseudo-LiDAR Point Cloud," 14 pages, arXiv:1903.09847v4 [cs.CV] Aug. 31, 2019.

(Continued)

*Primary Examiner* — Gregory M Desire
(74) *Attorney, Agent, or Firm* — Christopher G. Darrow; Darrow Mustafa PC (57) ABSTRACT

A system for generating point clouds having surface normal information includes one or more processors and a memory having a depth map generating module, a point cloud generating module, and surface normal generating module. The depth map generating module causes the one or more processors to generate a depth map from one or more images of a scene. The point cloud causes the one or more processors to generate a point cloud from the depth map having a plurality of points corresponding to one or more pixels of the depth map. The surface normal generating module causes the one or more processors to generate surface normal information for at least a portion of the one or more pixels of the depth map and inject the surface normal information into the point cloud such that the plurality of points of the point cloud include three-dimensional location information and surface normal information.

20 Claims, 6 Drawing Sheets

(56) References Cited

U.S. PATENT DOCUMENTS

| | | | |
|---|---|---|---|
| 10,217,234 B2* | 2/2019 | Lee | G06F 30/00 |
| 10,783,622 B2* | 9/2020 | Wang | G06T 5/002 |
| 10,937,178 B1* | 3/2021 | Srinivasan | G06T 7/70 |
| 10,964,038 B2* | 3/2021 | Wang | G06T 3/4007 |
| 2014/0081459 A1* | 3/2014 | Dubois | B25J 9/1697 |
| | | | 700/259 |
| 2018/0088234 A1* | 3/2018 | Scherer | G01S 7/4808 |
| 2018/0284277 A1* | 10/2018 | LaChapelle | G01S 17/931 |
| 2020/0090359 A1 | 3/2020 | Pillai et al. | |
| 2021/0072396 A1* | 3/2021 | Wang | G01S 7/4863 |
| 2021/0090289 A1* | 3/2021 | Karanam | G06K 9/6262 |
| 2021/0201527 A1* | 7/2021 | Cai | G06K 9/6201 |

OTHER PUBLICATIONS

Liu et al., "PLIN: A Network for Pseudo-LiDAR Point Cloud Interpolation," 7 pages, arXiv:1909.07137v1 [cs.CV] Sep. 16, 2019.
Sahin et al., "A Review on Object Pose Recovery: from 3D Bounding Box Detectors to Full 6d Pose Estimators," 25 pages, arXiv:2001.10609v2 [cs.CV] Apr. 19, 2020.
Qi et al., "GeoNet: Geometric Neural Network for Joint Depth and Surface Normal Estimation," 2018 IEEE/CVF Conference on Computer Vision and Pattern Recognition, Salt Lake City, UT, 2018, pp. 283-291.

* cited by examiner

SYSTEM AND METHOD FOR GENERATING A POINT CLOUD THAT INCLUDES SURFACE NORMAL INFORMATION

TECHNICAL FIELD

The subject matter described herein relates, in general, to systems and methods for generating point clouds and, more particularly, to systems and methods for generating point clouds that include surface normal information.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some current vehicles are equipped with sensors that are capable of detecting objects located near the vehicle. Several different types of sensors may be utilized, such as cameras, light detection and ranging (LIDAR) sensors, radar sensors, sonar sensors, combinations thereof, and the like.

Some prefer LIDAR sensors because data can be collected quickly and with high accuracy. LIDAR sensors collect information and generate three-dimensional point clouds that represent points in a three-dimensional space of the environment scanned by the LIDAR sensor. However, LIDAR sensors have several drawbacks, including cost, the sparseness of data, and limited use in adverse weather conditions, such as heavy rain and snow.

As such, some vehicles utilize camera sensors in addition to, or as an alternative to, LIDAR sensors. Camera sensors are fairly inexpensive and provide dense data. However, because images captured by cameras do not inherently provide depth information, additional processing must be performed to determine depth. Furthermore, object detection and tracking systems have been generally more successfully implemented utilizing data generated from LIDAR sensors as opposed to data only generated by camera sensors.

SUMMARY

This section generally summarizes the disclosure and is not a comprehensive explanation of its full scope or all its features.

In one embodiment, a method for generating point clouds that include surface normal information first performs the step of generating a depth map from one or more images of a scene. The depth map may have pixels that include a pixel location and a depth value. The depth value generally indicates a distance to a surface of an object within the scene. Next, the method may then generate a point cloud from the depth map. The point cloud may have a plurality of points corresponding to one or more pixels of the depth map. The plurality of points may each have three-dimensional location information.

The method may then generate surface normal information for at least a portion of the one or more pixels of the depth map. The surface normal information may be a unitary three-dimensional vector describing the direction perpendicular to the surface the three-dimensional point represents. The surface normal information may then be injected into the point cloud such that the plurality of points of the point cloud include three-dimensional location information and surface normal information that corresponds to one or more corresponding pixels of the depth map. The point cloud, with the additional surface normal information, may then be utilized to detect and/or track objects within the scene.

In another embodiment, a system includes one or more processors and a memory in communication with the one or more processors. The memory may have a depth map generating module, a point cloud generating module, and a surface normal generating module. The depth map generating module may include instructions that, when executed by the one or more processors, cause the one or more processors to generate a depth map from one or more images of a scene. The depth map may have pixels that include a pixel location and a depth value. Like before, the depth value may indicate a distance to a surface of an object within the scene.

The point cloud generating module may include instructions that, when executed by the one or more processors, cause the one or more processors to generate a point cloud from the depth map. The point cloud may have a plurality of points corresponding to one or more pixels of the depth map. The plurality of points may have three-dimensional location information.

The surface normal generating module may include instructions that, when executed by the one or more processors, cause the one or more processors to generate surface normal information for at least a portion of the one or more pixels of the depth map. The surface normal generating module may also cause the one or more processors to inject the surface normal information into the point cloud such that the plurality of points of the point cloud include three-dimensional location information and surface normal information that corresponds to one or more corresponding pixels of the depth map.

In yet another embodiment, a non-transitory computer-readable medium may include instructions, that when executed by the one or more processors, cause the one or more processors to generate a depth map from one or more images of a scene having pixels that include a pixel location and a depth value, generate a point cloud from the depth map having a plurality of points corresponding to one or more pixels of the depth map, generate surface normal information for at least a portion of the one or more pixels of the depth map, and inject the surface normal information into the point cloud such that the plurality of points of the point cloud include three-dimensional location information and surface normal information that corresponds to one or more corresponding pixels of the depth map Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented

DETAILED DESCRIPTION

Described is a system and method for generating a point cloud that includes surface normal information. Moreover, LIDAR sensors can detect objects and provide distance information of the objects detected by the LIDAR sensor. However, LIDAR sensors have several drawbacks, including cost and sparseness of data. Instead, some object detection systems utilize cameras in addition to, or as an alternative to, LIDAR sensors. Images captured by cameras are generally feature-rich and dense.

These feature-rich and dense images are generally processed by a depth map model that generates a depth map that essentially converts the image into a two-dimensional image wherein the pixel values indicate how close or far away surfaces are from the camera. From there, some systems convert the depth map into a pseudo-LIDAR point cloud. A pseudo-LIDAR point cloud is a point cloud similar to a LIDAR-based point cloud but originates not from data collected from a LIDAR sensor, but rather from a depth map generated from an image captured by a camera.

The system and method described in this specification generate not only a pseudo-LIDAR point cloud from a depth map, but also generate surface normal information for one or more points of the pseudo-LIDAR point cloud that is injected into the pseudo-LIDAR point cloud. By so doing, downstream processes, such as object detection and tracking, can utilize this information to detect and track objects more accurately. Furthermore, this additional information can be utilized to "clean up" the pseudo-LIDAR point cloud and remove points from the pseudo-LIDAR point cloud that are most likely caused by noise from the captured image or processing errors that occurred when generating the depth map and/or the pseudo-LIDAR point cloud.

Figure 1:
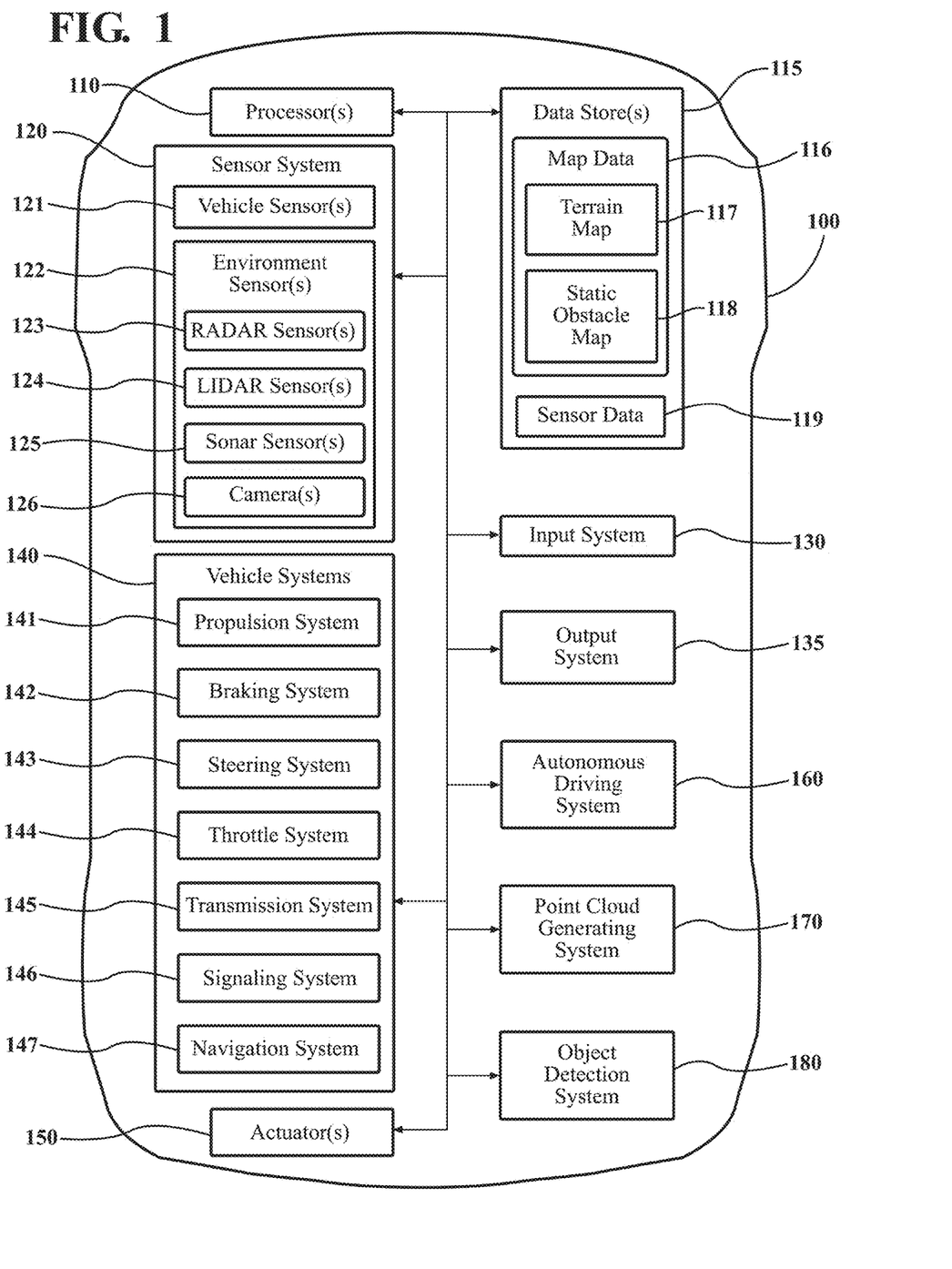
FIG. 1 illustrates a vehicle having a point cloud generating system that generates a point cloud along with surface normal information.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to the autonomous driving system 160.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes a point cloud generating system 170. The point cloud generating system 170 may be incorporated within the autonomous driving system 160 or may be separate, as shown. The point cloud generating system 170 may, briefly, receive an input image from a camera, such as camera(s) 126, convert the image to a depth map, generate a pseudo-LIDAR point cloud from the depth map, determine surface normal information for one or more points of the pseudo-latter point cloud and then inject this information into the pseudo-LIDAR point cloud. This injection of additional information improves the pseudo-LIDAR point cloud because the surface normal information can be utilized by downstream processes, such as object detection and tracking, to improve the overall accuracy and performance of these downstream processes.

Figure 2:
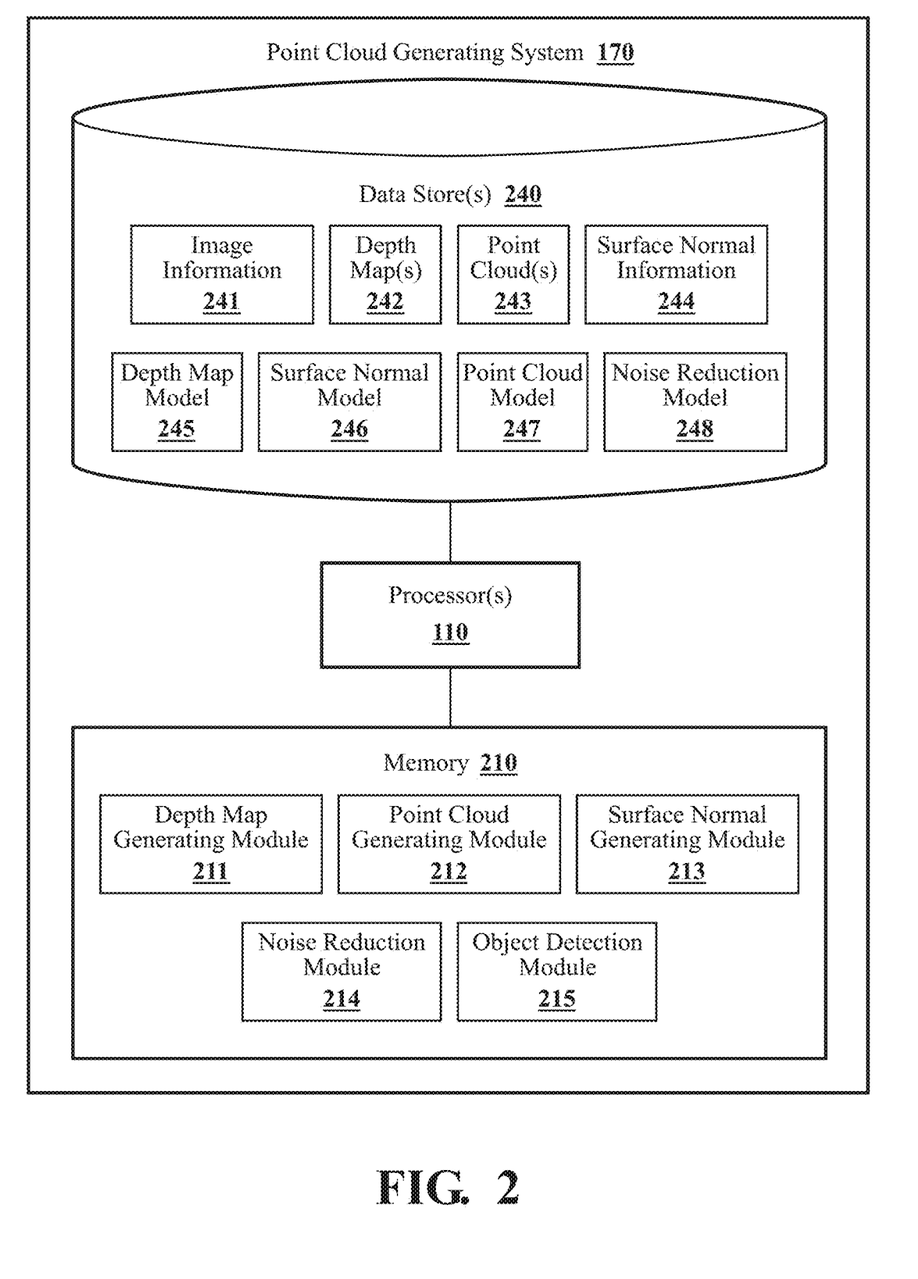
FIG. 2 illustrates the point cloud generating system of FIG. 1 in greater detail.

With reference to FIG. 2, one embodiment of the point cloud generating system 170 is further illustrated. As shown, the point cloud generating system 170 includes a processor(s) 110. Accordingly, the processor(s) 110 may be a part of the point cloud generating system 170 or the point cloud generating system 170 may access the processor(s) 110 through a data bus or another communication path. In one or more embodiments, the processor(s) 110 is an application-specific integrated circuit that is configured to implement functions associated with depth map generating module 211, a point cloud generating module 212, a surface normal generating module 213, a noise reduction module 214, and/or an object detection module 215. In general, the processor(s) 110 is an electronic processor such as a microprocessor that is capable of performing various functions as described herein. In one embodiment, the point cloud generating system 170 includes a memory 210 that stores the modules 211-215. The memory 210 is a random-access memory (RAM), read-only memory (ROM), a hard disk drive, a flash memory, or other suitable memory for storing the modules 211-215. The modules 211-215 are, for example, computer-readable instructions that, when executed by the processor(s) 110, cause the processor(s) 110 to perform the various functions disclosed herein.

Furthermore, in one embodiment, the point cloud generating system 170 includes a data store(s) 240. The data store(s) 240 is, in one embodiment, an electronic data structure such as a database that is stored in the memory 210 or another memory and that is configured with routines that can be executed by the processor(s) 110 for analyzing stored data, providing stored data, organizing stored data, and so on. Thus, in one embodiment, the data store(s) 240 stores data used or generated by the modules 211-215 in executing various functions.

In one example, the data store(s) 240 include image information 241, which may be one or more images captured by the camera(s) 126. The data store(s) 240 may also store depth maps 242 generated from the image information, point clouds 243 generated from the depth maps 242, and surface normal information 244 generated from the point clouds 243.

In addition to storing data captured by a sensor or generated by the point cloud generating system 170, the data store(s) 240 may include one or more models that may be trained neural networks 245-248. The neural networks may be trained in any one of several different manners. In this example, one or more of the neural networks 245-248 may be trained in a self-supervised fashion, wherein the input data is a source of supervision.

For example, the depth map model 245 can generate one or more depth maps 242 based on the image information 241. A depth map may be an image or image channel that contains information relating to the distance of the surfaces of scene objects from a viewpoint, such as a viewpoint of a camera, such as camera(s) 126. The depth map model 245 may be trained in a self-supervised fashion, as described in U.S. Pat. App. Pub. No. 2020/0090359 to Pillai et al., which is hereby incorporated by reference in its entirety. However, it should be understood that several different methodologies for training the depth map model 245 and/or generating a depth map may be utilized.

The surface normal model 246 may also be a trained neural network that can generate surface normal information using the depth map. In one example, the surface normal model 246 may generate surface normal information by finding two or more nearest neighbor pixel or points in the depth map and compute a surface plane which incorporates those neighbors and the point itself. A normal, which is the surface normal information, to that surface plane is then calculated at the location of the pixel of the depth map. Of course, it should be understood that other methodologies for determining surface normal information using a depth map as an input could be utilized instead.

The point cloud model 247 may also be a trained neural network that can generate a point cloud based on the depth map generated by the depth map model 245. The point cloud model 247 may generate the point cloud by back projecting the depth map into a three-dimensional space.

The noise reduction model 248 may be a trained neural network that seeks to remove points generated by the point cloud model 247 that may be noise. "Noise" could include points of the point cloud that were either generated in error or based on issues with the original image captured by the camera and/or the processing of the image captured by the camera. As such, the point cloud generated by the point cloud model 247 can be cleaned up to remove any noisy points to improve the overall performance of downstream processes such as object detection and/or object tracking.

Accordingly, the depth map generating module 211 may include instructions that, when executed by the processor(s) 110, cause the processor(s) 110 to generate a depth map. Moreover, the processor(s) 110 are provided an image captured by a sensor, such as the camera(s) 126. Any one of several different methodologies could be utilized by the depth map generating module 211 to generate a depth map. For example, as explained above, the depth map may be generated by the depth map generating module 211 using the depth map model 245, which may be a trained neural network.

Figure 3:
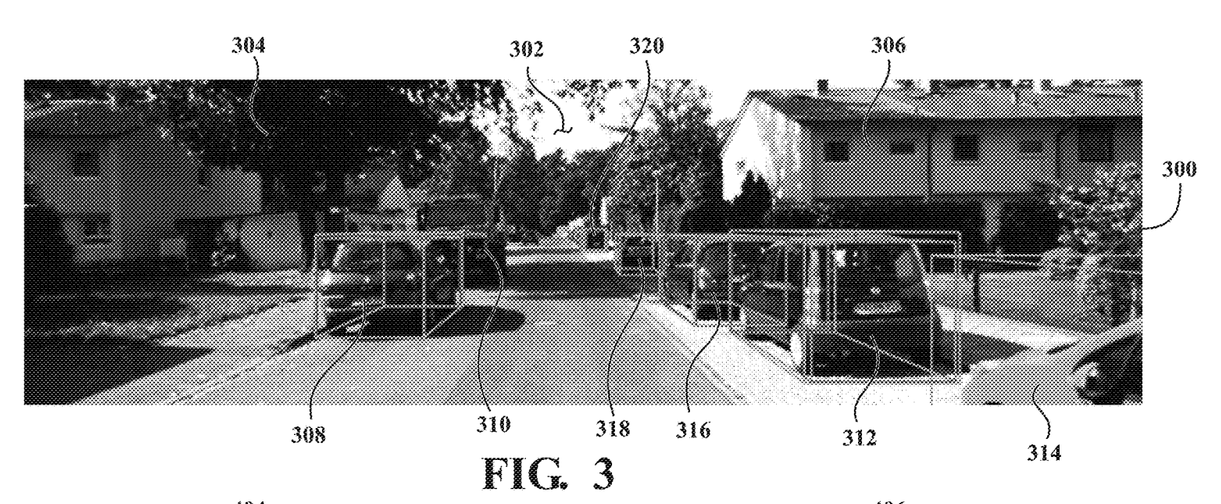
FIG. 3 illustrates an example of a scene captured by a camera.

For example, referring to FIG. 3, an example of an image 300 of a scene 302 captured by the camera(s) 126 is shown. In this example, the image 300 is a monocular image. However, it should be understood that the image 300 may be a pair of stereo images captured by a stereo camera. The scene 302 includes several objects, including a tree 304, a building 306, and vehicles 308-320. The depth map generating module 211 may cause the processor(s) 110 to generate a depth map.

Figure 4:
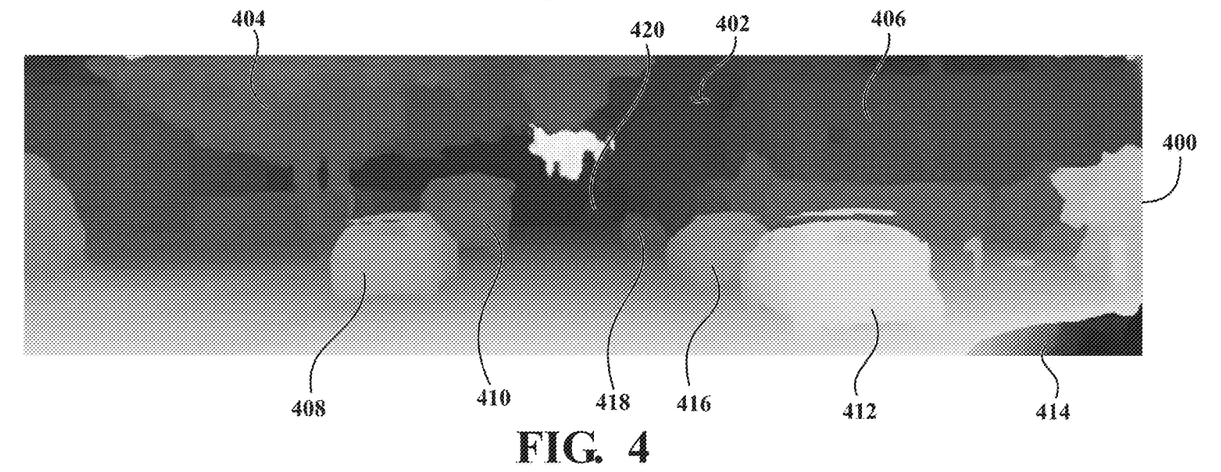
FIG. 4 illustrates a depth map generated by the scene of FIG. 3.

As such, referring to FIG. 4, an example of a depth map 400 of a scene 402 that corresponds to the image 300 and the scene 302 of FIG. 3, respectively, is shown. As stated previously, the depth map 400 may be an image comprising a plurality of pixels. Each pixel has a depth value associated. As such, the depth values for pixels of the depth map 400 represents the distance from a viewpoint, such as the camera(s) 126 to the surface of any objects located within the depth map 400. As such, in this example, the vehicle 412 generally includes pixel values indicating that the surfaces of the vehicle 412 are closer to the viewpoint of the camera(s) 126 than the vehicle 416.

The point cloud generating module 212 may include instructions that, when executed by the processor(s) 110, cause the processor(s) 110 to generate a point cloud. Generation of the point cloud may occur by back projecting the depth map 400 into a three-dimensional space. A point cloud generated by the processor(s) 110 may include a plurality of points corresponding to one or more pixels of the depth map. The plurality of points may each have three-dimensional location information within a three-dimensional space. Because the point cloud is based on an image captured by a camera instead of data collected from a LIDAR sensor, the point cloud may be referred to as a pseudo-LIDAR point cloud.

Figure 5:
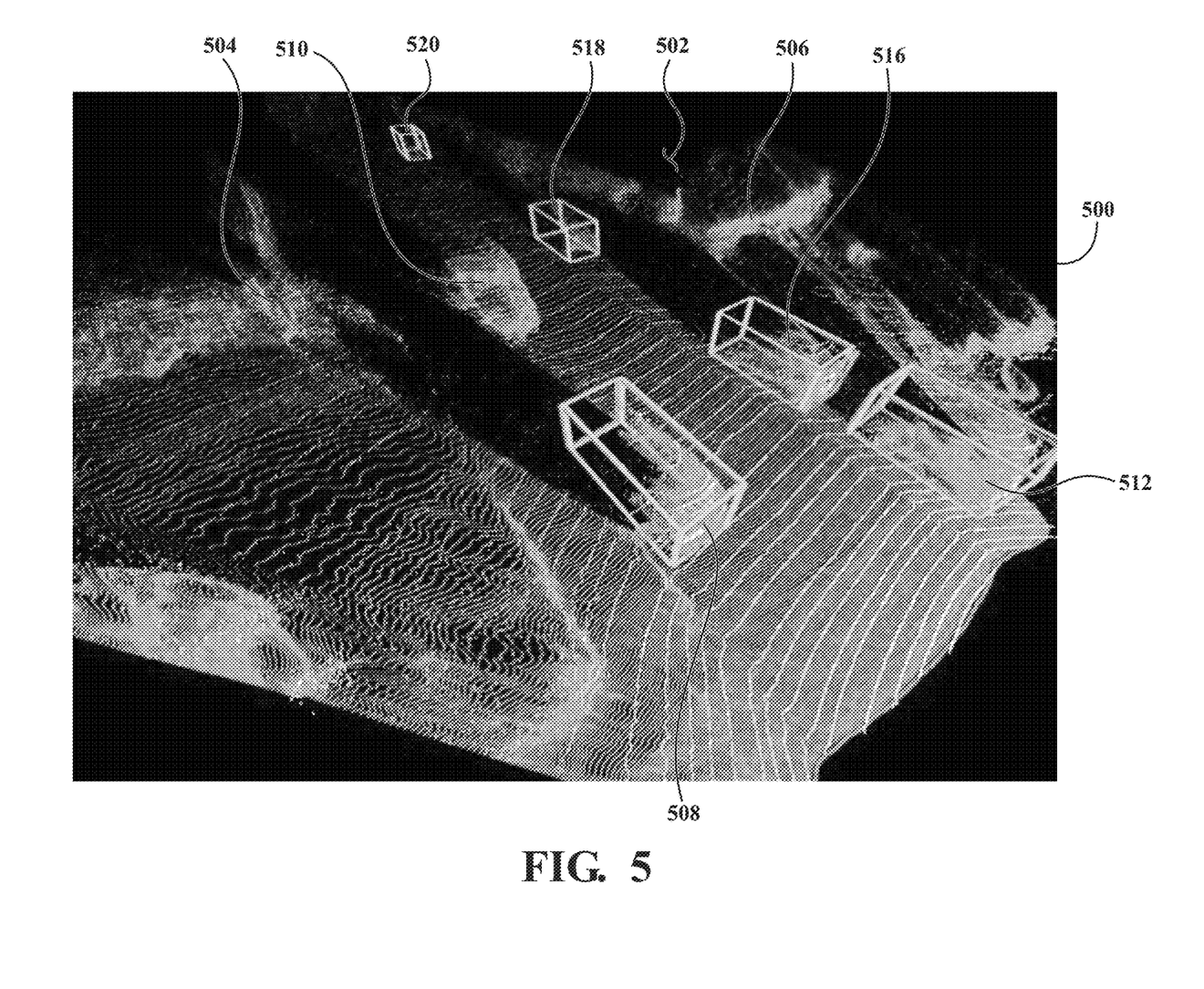
FIG. 5 illustrates a pseudo-LIDAR point cloud generated using the depth map of FIG. 4.

As such, referring to FIG. 5, illustrated is a point cloud 500 of a scene 502 to that is based on the depth map 400 of the scene 402 of FIG. 4, respectively. Like before, the point cloud 500 includes objects 504-520, which corresponds to the objects 404-420 of FIG. 4. Bounding boxes have been placed around the objects 508, 512, 516, 518, 520 to illustrate the location of these objects. The points of the point cloud 500 indicate the location, in a three-dimensional space, of the surface of objects within the scene 502.

Figure 6A:
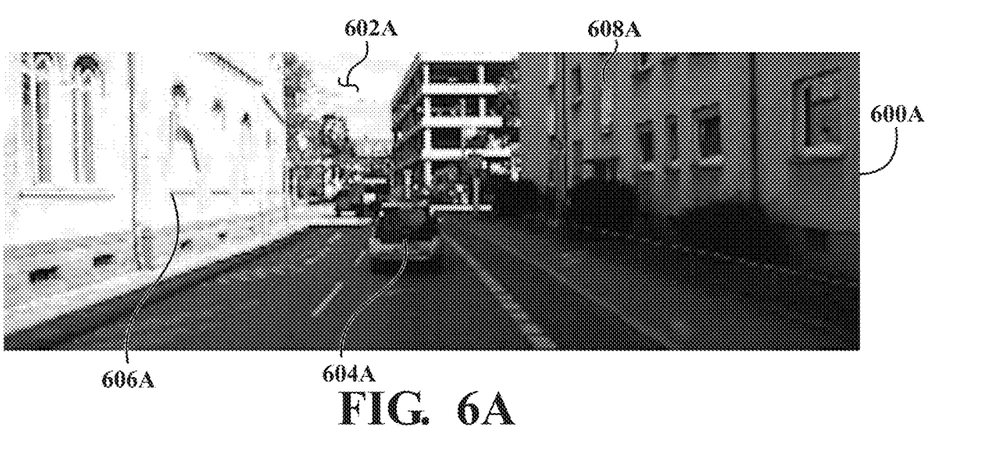
FIGS. 6A-6C illustrate an image of a scene captured from a camera, a depth map generated from the image, and surface normal information generated from the depth map, respectively.
Figure 6B:
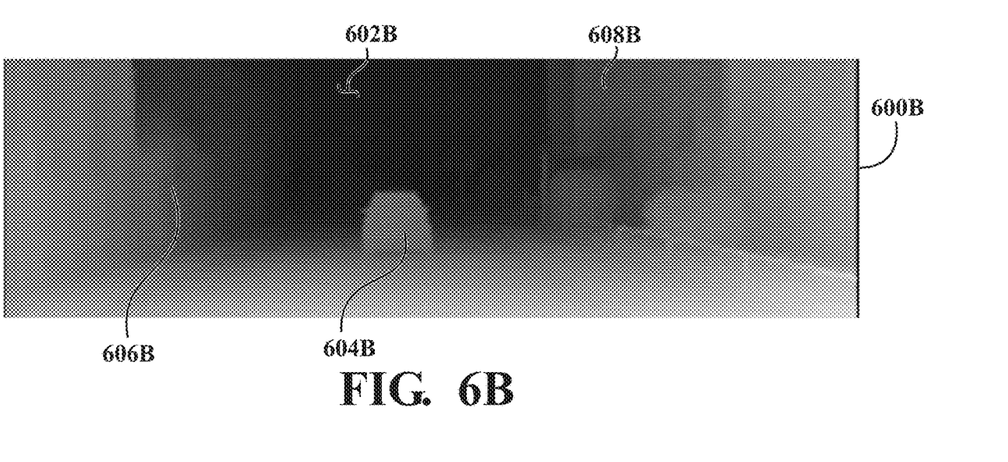
Figure 6C:
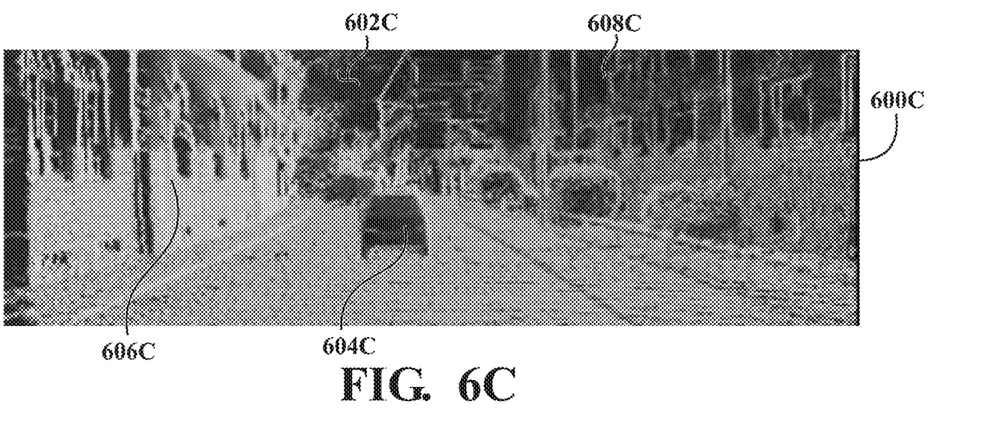

The surface normal generating module 213 may include instructions that, when executed by the processor(s) 110, cause the processor(s) 110 to generate surface normal information for at least a portion of the one or more pixels of the depth map. For example, referring to FIGS. 6A-6C, illustrated is an image 600A captured by a camera, a depth map 600B of the image 600A, and surface normal information 600C for the pixels forming the depth map 600B. Here, the image 600A is of a scene 602A. The scene 602A includes several objects, such as a vehicle 604A, and buildings 606A and 608A. As described above, the depth map generating module 211 causes the processor(s) 110 to generate the depth map 600B having a scene 602B by using the image 600A of the scene 602A. As such, the depth map 600B also includes objects 602B-608B that correspond to the objects 602A-608A.

The surface normal generating module 213 causes the processor(s) 110 to generate the surface normal information 600C having a scene 602C using the depth map 600B. In three dimensions, a surface normal, or simply normal, to a surface at point P is a vector perpendicular to the tangent plane of the surface at P. As such, any one of a number of different methodologies for determining surface normal information for the pixels of the depth map 600B can be utilized.

In one example, the surface normal generating module 213 causes the processor(s) 110 to determine one or more planes formed within the depth map 600B, determine a surface for each of the one or more planes, and determine a normal direction to the surface. The normal direction to the surface may be the surface normal information. However, as explained previously, any one of a number of different methodologies for determining surface normal information from a depth map could be utilized.

The surface normal generating module 213 also causes the processor(s) 110 to inject the surface normal information into the point cloud such that the plurality of points of the point cloud include three-dimensional location information and surface normal information that corresponds to one or more corresponding pixels of the depth map. For example, as stated previously, surface normal information is generated by determining surfaces formed by the pixels of the depth map 600B and then determining the normal direction to that surface. Also, as previously stated, the point cloud generating module 212 causes the processor(s) 110 to generate a point cloud by back-propagating a depth map into a three-dimensional space, such as the depth map 600B.

Here, once the surface normal information is determined, the surface normal information is associated with corresponding points of the point cloud. As explained previously, both the point cloud and the surface normal information use the depth map as input. The surface normal information associated with particular pixels of a depth map can be associated with points of a point cloud generated by the same pixels of the depth map. As such, the points of the point cloud can have surface normal information associated.

As such, when the surface normal generating module 213 causes the processor(s) 110 to inject the surface normal information into the point cloud, the particular points of the point cloud will receive corresponding surface normal information that corresponds with pixels of the depth map used to generate the particular points. Therefore, the pixels of the point cloud include not only location information, but also surface normal information.

The noise reduction module 214 includes instructions that, when executed by the processor(s) 110, cause the processor(s) 110 to remove one or more points of a point cloud by using surface normal information. Moreover, when a point cloud is generated by the point cloud generating module 212, the point cloud generated may include some noise. Noise can be in the form of one or more points of the point cloud that are not necessarily associated with any object of a scene of an image captured by a camera. In some cases, noise can be generated by issues with the camera and/or issues with generating the point cloud. For example, if a protective lens of a camera has dirt or other environmental pollutants on the surface of the protective lens, a point cloud may be generated that could include some noise. The same may also occur when the captured image by the camera is taken during adverse weather conditions, such as when it is snowing.

For example, the noise reduction module 214 may cause the processor(s) 110 to identify points of the point cloud that are relatively distant from other points of the point cloud. Once these points are identified, the noise reduction module 214 may cause the processor(s) 110 to determine the surface normal information for each of the identified points. If the surface normal information indicates that the point of the point cloud is by itself and unrelated to other points of the point cloud, the noise reduction module 214 may cause the processor(s) 110 to remove the point from the point cloud. By so doing, noise, or points of a point cloud that have no relation to objects within an image, can be removed from a point cloud to improve downstream processes.

The memory 210 may also include the object detection module 215. It should be understood that the object detection module 215 may not be incorporated within the point cloud generating system 170 and could be incorporated in a separate system, such as the object detection system 180 of FIG. 1. Here, the object detection module 215 may include instructions that cause the processor(s) 110 to identify one or more objects located within the point cloud using both the points of the point cloud as well as the surface normal information that was previously injected into the point cloud. The object detection module 215 may cause the processor(s) 110 to identify and classify objects within the point cloud. Additionally or alternatively, the object detection module 215 may also include instructions that cause the processor(s) 110 to track identified objects. Again, it should be understood that the point cloud generating system 170 may not include the object detection module 215.

Figure 7:
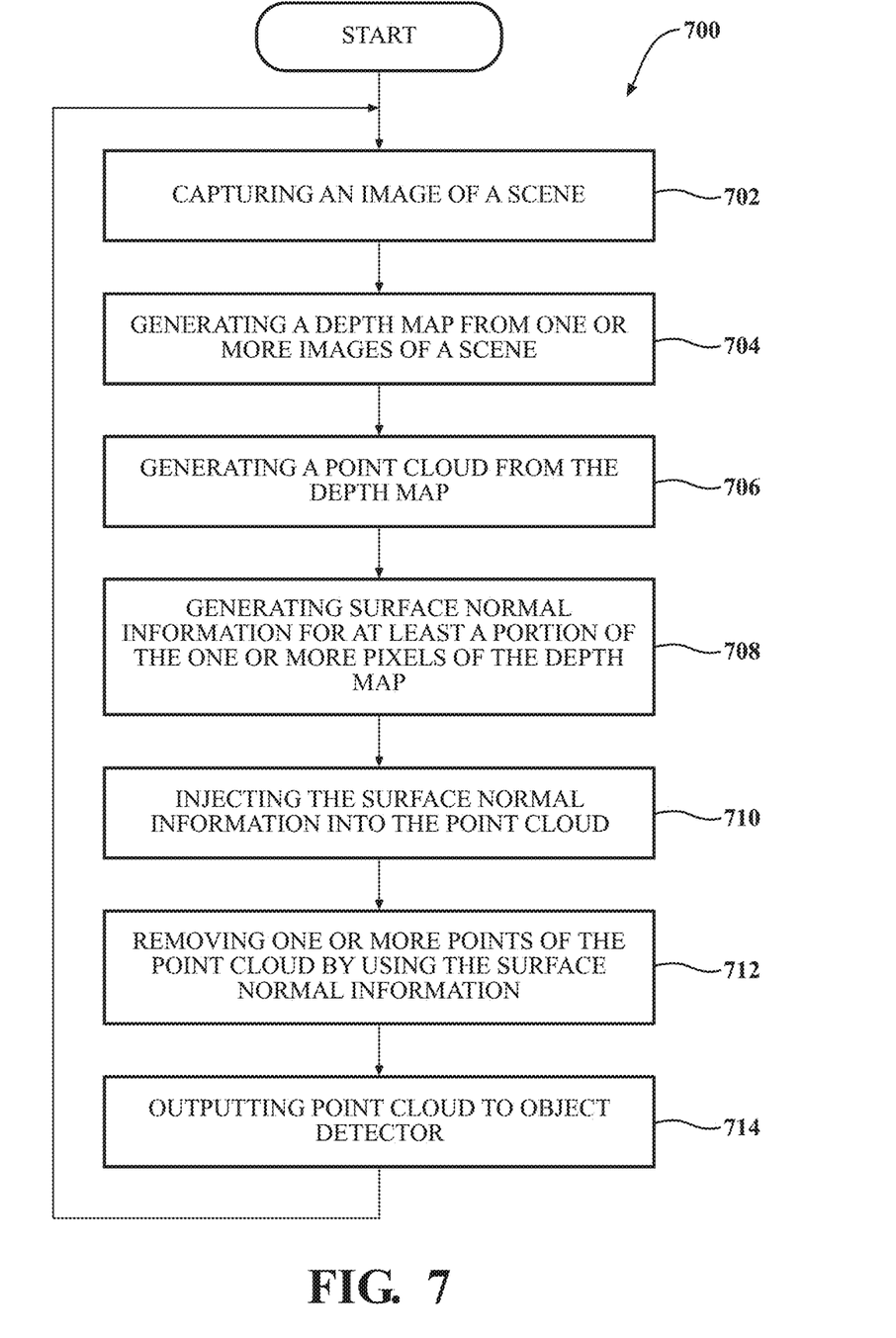
FIG. 7 illustrates a method for generating a point cloud along with surface normal information.

Referring to FIG. 7, a method 700 for generating a point cloud that includes surface normal information is shown. The method 700 will be described from the viewpoint of the vehicle 100 of FIG. 1 and the point cloud generating system 170 of FIG. 2. However, it should be understood that this is just one example of implementing the method 700. While method 700 is discussed in combination with the point cloud generating system 170, it should be appreciated that the method 700 is not limited to being implemented within the point cloud generating system 170, but is instead one example of a system that may implement the method 700.

The method 700 begins at step 702, wherein the camera(s) 126 of the vehicle 100 capture an image of a scene. For example, referring to FIG. 3, an example of an image 300 of a scene 302 captured by the camera(s) 126 is shown. In this example, the image 300 is a monocular image. However, it should be understood that the image 300 may be a pair of stereo images captured by a stereo camera. The scene 302 includes several objects, including a tree 304, a building 306, and vehicles 308-320. The depth map generating module 211 may cause the processor(s) 110 to generate a depth map.

In step 704, the depth map generating module 211 may cause the processor(s) 110 to generate a depth map using the image captured in the previous step as an input. Anyone of a number of different methodologies for generating a depth map from an image could be utilized. As best shown in FIG. 4, the depth values for pixels of the depth map 400 represents the distance from a viewpoint, such as the camera(s) 126 to the surface of any objects located within the depth map 400. As such, in this example, the vehicle 412 generally includes pixel values indicating that the surfaces of the vehicle 412 are closer to the viewpoint of the camera(s) 126 than the vehicle 416.

In step 706, the point cloud generating module 212 causes the processor(s) 110 to generate a point cloud using the depth map generated in the previous step is an input. Generation of the point cloud may occur by back projecting the depth map into a three-dimensional space. As such, referring to FIG. 5, illustrated is a point cloud 500 of a scene 502 that is based on the depth map 400 of the scene 402 of FIG. 4, respectively Like before, the point cloud 500 includes objects 504-520, which corresponds to the objects 404-420 of FIG. 4.

In step 708, the surface normal generating module 213 causes the processor(s) 110 to generate surface normal information for least a portion of the pixels of the depth map that was generated in step 706. In one example, the surface normal generating module 213 causes the processor(s) 110 to determine one or more planes formed within the depth map 600B, determine a surface for each of the one or more planes, and determine a normal direction to the surface. The normal direction to the surface may be the surface normal information. However, as explained previously, any one of a number of different methodologies for determining surface normal information from a depth map could be utilized.

In step 710, the surface normal generating module 213 causes the processor(s) 110 to inject the surface normal information into the point cloud such that the plurality of points of the point cloud include three-dimensional location information and surface normal information that corresponds to one or more corresponding pixels of the depth map. Here, once the surface normal information is determined, the surface normal information is associated with corresponding point points of the point cloud. As explained previously, both the point cloud and the surface normal information use the depth map as input. The surface normal information associated with particular pixels of a depth map can be associated with points of a point cloud generated by the same pixels of the depth map. As such, the points of the point cloud can have surface normal information associated.

In step 712, which could be optional, the noise reduction module 214 causes the processor(s) 110 to remove one or more points of a point cloud by using surface normal information. Moreover, when a point cloud is generated by the point cloud generating module 212, the point cloud generated may include some noise. Noise can be in the form of one or more points of the point cloud that are not necessarily associated with any object of a scene of an image captured by a camera. In one example, the noise reduction module 214 may cause the processor(s) 110 to identify points of the point cloud that are relatively distant from other points of the point cloud using the surface normal information that was injected previously into the point cloud in step 710.

In step 714, which may also be optional, the method 700 and outputs the point cloud with the additional surface normal information that was injected in step 710 (and optionally removed some points of the point cloud in step 712) to an object detector and/or object tracker. In some cases, the object detector could be a separate system, as shown as the object detection system 180, but could also be incorporated within another system, such as the point cloud generating system 170 and/or the autonomous driving system 160. Thereafter, the method returns to the beginning.

As such, by injecting surface normal information into a point cloud, downstream processes, such as object detection and tracking, can utilize this information to detect and track objects more accurately. Furthermore, this additional information can be utilized to "clean up" the pseudo-LIDAR point cloud and remove points from the pseudo-LIDAR point cloud that are most likely caused by noise from the captured image or processing errors that occurred when generating the depth map and/or the pseudo-LIDAR point cloud.

FIG. 1 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the point cloud generating system 170 to ensure the vehicle 100 remains within defined state constraints.

The vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data store(s) 115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data store(s) 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data store(s) 115 located onboard the vehicle 100. Alternatively, or in addition, at least a portion of the map data 116 and/or the sensor data 119 can be located in one or more data store(s) 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensor(s) 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more camera(s) 126. In one or more arrangements, the one or more camera(s) 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the point cloud generating system 170, and/or the autonomous driving system 160 can be operatively connected to communicate with the vehicle systems 140 and/or individual components thereof. For example, returning to FIG. 1, the processor(s) 110 and/or the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140 and, thus, may be partially or fully autonomous.

The processor(s) 110 and/or the autonomous driving system 160 can be operatively connected to communicate with the vehicle systems 140 and/or individual components thereof. For example, returning to FIG. 1, the processor(s) 110 and/or the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140.

The processor(s) 110 and/or the autonomous driving system 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving system 160 can control the direction and/or speed of the vehicle 100. The processor(s) 110 and/or the autonomous driving system 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving system 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving systems 160. The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine the position and velocity of the vehicle 100. The autonomous driving system 160 can determine the location of obstacles, obstacles, or other environmental features, including traffic signs, trees, shrubs, neighboring vehicles, pedestrians, etc.

The autonomous driving system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 either independently or in combination with the point cloud generating system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving system 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for generating surface normal information for a pseudo-LIDAR point cloud, the method comprising the steps of:

generating a depth map from one or more images of a scene, the depth map having pixels that include a pixel location and a depth value, the depth value indicating a distance to a surface of the scene;

generating the pseudo-LIDAR point cloud from the depth map, the pseudo-LIDAR point cloud having a plurality of points corresponding to one or more pixels of the depth map, the plurality of points each having three-dimensional location information;

generating surface normal information for at least a portion of the pixels of the depth map; and injecting the surface normal information into the pseudo-LIDAR point cloud such that the plurality of points of the pseudo-LIDAR point cloud include three-dimensional location information and surface normal information that corresponds to one or more corresponding pixels of the depth map.

2. The method of claim 1, wherein the one or more images of the scene are at least one of a monocular image and a stereo image pair.

3. The method of claim 1, further comprising the step of removing one or more points of the pseudo-LIDAR point cloud by using the surface normal information.

4. The method of claim 1, further comprising the steps of identifying one or more objects within the pseudo-LIDAR point cloud by using the surface normal information of the plurality of points of the pseudo-LIDAR point cloud.

5. The method of claim 1, wherein the surface normal information is generated by:
    determining one or more planes formed within the depth map;
    determining a surface for each of the one or more planes; and
    determining a normal direction to the surface, the normal direction being the surface normal information, the surface normal information corresponding to the pixels of the depth map that form the one or more planes.

6. The method of claim 1, wherein the pseudo-LIDAR point cloud is generated by back-projecting the depth map into the pseudo-LIDAR point cloud in a LIDAR coordinate system.

7. A system for generating surface normal information for a pseudo-LIDAR point cloud, the system comprising:
    one or more processors; and
    a memory in communication with the one or more processors, the memory having
        a depth map generating module having instructions that, when executed by the one or more processors, cause the one or more processors to generate a depth map from one or more images of a scene, the depth map having pixels that include a pixel location and a depth value, the depth value indicating a distance to a surface of the scene,
        a point cloud generating module having instructions that, when executed by the one or more processors, cause the one or more processors to generate the pseudo-LIDAR point cloud from the depth map, the pseudo-LIDAR point cloud having a plurality of points corresponding to one or more pixels of the depth map, the plurality of points each having three-dimensional location information,
        a surface normal generating module having instructions that, when executed by the one or more processors, cause the one or more processors to generate surface normal information for at least a portion of the pixels of the depth map, and
        the surface normal generating module having instructions that, when executed by the one or more processors, cause the one or more processors to inject the surface normal information into the pseudo-LIDAR point cloud such that the plurality of points of the pseudo-LIDAR point cloud include three-dimensional location information and surface normal information that corresponds to one or more corresponding pixels of the depth map.

8. The system of claim 7, wherein the one or more images of the scene are at least one of a monocular image and a stereo image pair.

9. The system of claim 7, further comprising a noise reduction module having instructions that, when executed by the one or more processors, cause the one or more processors to remove one or more points of the pseudo-LIDAR point cloud by using the surface normal information.

10. The system of claim 7, further comprising an object detection module having instructions that, when executed by the one or more processors, cause the one or more processors to the steps of identify one or more objects within the pseudo-LIDAR point cloud by using the surface normal information of the plurality of points of the pseudo-LIDAR point cloud.

11. The system of claim 7, wherein the surface normal generating module further includes instructions that, when executed by the one or more processors, cause the one or more processors to:
    determine one or more planes formed within the depth map;
    determine a surface for each of the one or more planes; and
    determine a normal direction to the surface, the normal direction being the surface normal information, the surface normal information corresponding to the pixels of the depth map that form the one or more planes.

12. The system of claim 7, wherein the point cloud generating module further includes instructions that, when executed by the one or more processors, cause the one or more processors to generate the pseudo-LIDAR point cloud by back-projecting the depth map into the pseudo-LIDAR point cloud in a LIDAR coordinate system.

13. The system of claim 7, further comprising at least one camera mounted to a vehicle, the camera being configured to capture the one or more images of a scene.

14. The system of claim 7, wherein at least one of the depth map generating, the point cloud generating module, and the surface normal generating utilize a neural network that was trained in a self-supervised fashion.

15. A non-transitory computer readable medium having instructions, that when executed by the one or more processors cause the one or more processors to:
    generate a depth map from one or more images of a scene, the depth map having pixels that include a pixel location and a depth value, the depth value indicating a distance to a surface of the scene;
    generate a pseudo-LIDAR point cloud from the depth map, the pseudo-LIDAR point cloud having a plurality of points corresponding to one or more pixels of the depth map, the plurality of points each having three-dimensional location information;
    generate surface normal information for at least a portion of the pixels of the depth map; and
    inject the surface normal information into the pseudo-LIDAR point cloud such that the plurality of points of the pseudo-LIDAR point cloud include three-dimensional location information and surface normal information that corresponds to one or more corresponding pixels of the depth map.

16. The non-transitory computer-readable medium of claim 15, wherein the one or more images of the scene are at least one of a monocular image and a stereo image pair.

17. The non-transitory computer-readable medium of claim 15, wherein the non-transitory computer readable medium further includes instructions, that when executed by the one or more processors cause the one or more processors to remove one or more points of the pseudo-LIDAR point cloud by using the surface normal information.

18. The non-transitory computer-readable medium of claim 15, wherein the non-transitory computer readable medium further includes instructions, that when executed by the one or more processors cause the one or more processors to identify one or more objects within the pseudo-LIDAR point cloud by using the surface normal information of the plurality of points of the pseudo-LIDAR point cloud.

19. The non-transitory computer-readable medium of claim 15, wherein the non-transitory computer readable medium further includes instructions, that when executed by the one or more processors cause the one or more processors to:
  determining one or more planes formed within the depth map;
  determining a surface for each of the one or more planes; and
  determining a normal direction to the surface, the normal direction being the surface normal information, the surface normal information corresponding to the pixels of the depth map that form the one or more planes.

20. The non-transitory computer-readable medium of claim 15, wherein the pseudo-LIDAR point cloud is generated by back-projecting the depth map into the pseudo-LIDAR point cloud in a LIDAR coordinate system.

\* \* \* \* \*